(No Model.)

J. P. WIENS.
HANDLE FOR BICYCLE HANDLE BARS.

No. 599,084. Patented Feb. 15, 1898.

Witnesses.
C. H. Keeney
Anna V. Faust.

Inventor.
John P. Wiens
By Benedict Morsell
Attorneys.

THE NORRIS PETERS CO., PHOTO-LITHO., WASHINGTON, D. C.

UNITED STATES PATENT OFFICE.

JOHN P. WIENS, OF MILWAUKEE, WISCONSIN, ASSIGNOR, BY DIRECT AND MESNE ASSIGNMENTS, OF TWO-THIRDS TO SAMUEL S. WEIL, OF SAME PLACE.

HANDLE FOR BICYCLE HANDLE-BARS.

SPECIFICATION forming part of Letters Patent No. 599,084, dated February 15, 1898.

Application filed November 25, 1896. Serial No. 613,417. (No model.)

*To all whom it may concern:*

Be it known that I, JOHN P. WIENS, of Milwaukee, in the county of Milwaukee and State of Wisconsin, have invented a new and useful Improvement in Handles for Bicycle Handle-Bars, of which the following is a description, reference being had to the accompanying drawings, which are a part of this specification.

My invention relates to improvements in the handles on the handle-bar on the front wheel-post of a bicycle as commonly constructed, such handles being usually and preferably so constructed as to be removable from the handle-bar for repairs or renewal.

The object of the invention is to provide a yielding elastic handle soft and pleasant to the touch when grasped by the hand, that is light in weight, strong and enduring in quality, and especially inexpensive to make, and that may be readily and securely attached to the handle-bar removably.

Figure 1:
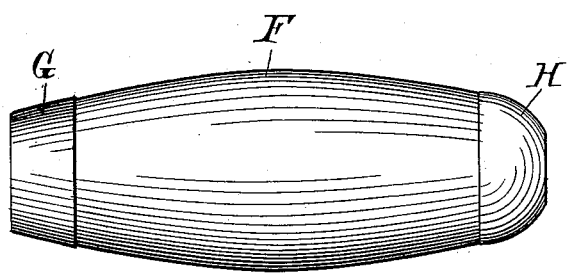
Figure 2:
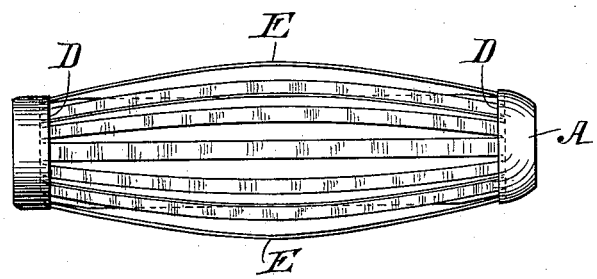
Figure 3:
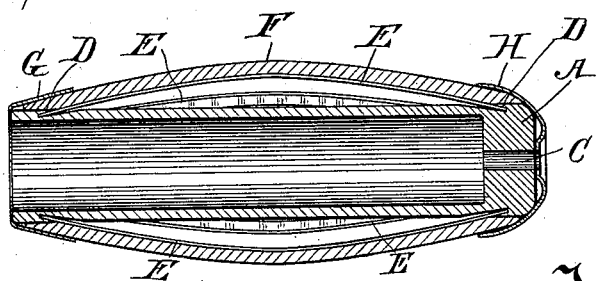

In the drawings, Figure 1 illustrates the exterior of a handle adapted for and with which my improvements are embodied. Fig. 2 exhibits a form of my improved construction, the parts shown being those existing in the handle shown in Fig. 1, the cover being omitted. Fig. 3 is a central longitudinal section of the complete handle illustrated in Fig. 1.

A principal object of the invention is to secure a soft yielding elastic handle by means of a construction that shall be strong and enduring and at the same time that is light in weight and can be inexpensively made. An important feature of this construction is to provide a spring or springs having the qualities just mentioned, and by my peculiar construction I am able to use short strips of thin steel bars or ribbons, which are very inexpensive and require no labor or machine-work to fit them for use in the handle. To successfully use such flat steel strips or ribbons, it is necessary to secure their ends in such positions and at such distances apart as to hold the strips or ribbons in a curved or bulging position normally centrally, and this is accomplished, preferably, by means of a cylindrical sleeve or spool A, provided with an axial aperture B, extending from one end quite far into the spool or sleeve, which aperture is of considerable diameter and is adapted to receive the end of the handle-bar therein and to which handle-bar the sleeve may be secured by cement or by means of a screw inserted axially from the other end through the aperture C into a wooden plug in the end of the handle-bar. These means for securing the handle to the bar are in common use. The sleeve A is provided near each end with an annular socket or shoulder D, adapted to receive thereagainst the respective ends of the several elastic steel strips E. These strips E are of the same width throughout their lengths and of equal lengths and are somewhat longer than the distance between the shoulders D D, so that when the ends of the strips are placed against the shoulders D they will assume the curved or bulging form shown in Figs. 2 and 3. Such number of these strips E are preferably used as will fill the annular space about the sleeve A at the shoulders or sockets D, so that the side edges of the strips will bear against the adjacent strips on either side, thus preventing their escaping from position laterally, and if a less number of strips are used their ends are to be secured against displacement laterally by cement, blocking, or otherwise. To further assist in holding these strips in position, it is advisable that the shoulders D shall be the bottoms or inner walls of shallow annular sockets or grooves in the forms shown in Fig. 3 and indicated in Fig. 2. As the circle in which the central parts (equidistant from the ends) of the strips E are located normally is considerably larger than the circles in which the ends of the strips are located these strips are normally separated from each other by considerable space at the center diminishing toward the ends, which provides opportunity for freedom of movement of the strips inwardly when compressed. It is desirable to cover these springs or this skeleton frame thus made with a flexible covering F, and for this purpose rubber, leather, cloth, or analogous material may be used. The ends of this cover are advisably inclosed and held in position by a metal band G at the inner end of the handle and by a metal cap H at the outer end of the handle, through which cap H centrally a screw may be inserted extending through the aperture C into the block in the handle-bar. This cover being flexible readily yields with the elastic strips E to the pressure of the hand and is soft and pleasant to the touch.

It will be understood that if one or more of the strips E should accidentally be broken by rough usage or otherwise the handle could readily be removed from its bar and being taken apart a new strip or strips could be conveniently put in place.

What I claim as my invention is—

1. A handle for a handle-bar comprising a cylindrical sleeve provided with annular shoulders near its ends, independent elastic metal strips longer than the distance apart of said shoulders and sufficient in number to encircle the sleeve, the ends of the strips being against the shoulders and the central parts bulging outwardly, and a flexible cover over the elastic strips and secured to the sleeve.

2. In a handle for a handle-bar, a series of longitudinally-disposed independent elastic flat metal strips of the same width throughout their length arranged to encircle the bar, means securing the strips at their ends at a less distance apart than their length so as to hold the strips normally in a curved or bulging position, and a flexible cover over the strips.

In testimony whereof I affix my signature in presence of two witnesses.

JOHN P. WIENS.

Witnesses:
C. T. BENEDICT,
ANNA V. FAUST.